H. LÖWY.
METHOD OF LOCATING SUBTERRANEAN STRATA.
APPLICATION FILED JUNE 3, 1912.
1,045,575. Patented Nov. 26, 1912.
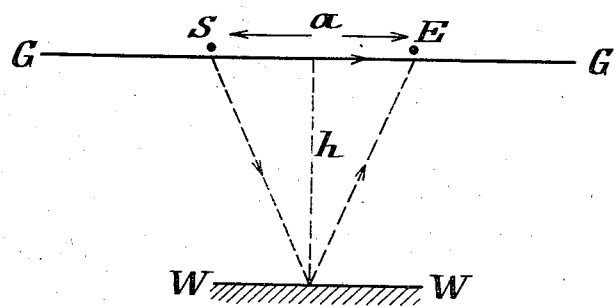

UNITED STATES PATENT OFFICE.

HEINRICH LÖWY, OF GÖTTINGEN, GERMANY.

METHOD OF LOCATING SUBTERRANEAN STRATA.

1,045,575.  Specification of Letters Patent.  Patented Nov. 26, 1912.

Application filed June 3, 1912. Serial No. 701,373.

*To all whom it may concern:*

Be it known that I, HEINRICH LÖWY, a subject of the Austro-Hungarian Emperor, residing at 5 Bühlstrasse, Göttingen, Germany, have invented certain new and useful Improvements in Methods of Locating Subterranean Strata; and I do hereby declare the following to be a full, clear, and exact description of the invention, such as will enable others skilled in the art to which it appertains to make and use the same.

My invention refers to methods of ascertaining the presence or absence and the position of subterranean strata or bodies of useful substances such as water, ore and such like by means of electrical waves. I have found by experiment that, contrary to opinions hitherto usually entertained, electrical waves easily pass for considerable distances through the interior of the earth, provided that the substances constituting the parts traversed by the electrical waves are nonconductors of electricity or at any rate possess a sufficiently low conductivity. Conductive substances on the other hand, as is well known, act as reflectors of electrical waves striking their surfaces. Thus, if electrical waves are transmitted through the interior of the earth from its surface downward or in any other direction, they will be reflected and will return, whenever they strike conductive strata or bodies, such as for instance strata containing water or ore. This discovery can be utilized to ascertain the presence and position of such strata by ordinary trigonometric calculations.

For this purpose my invention consists in emitting electrical waves from one point of the earth's surface and receiving them at another point the distance between both points along a practically straight line being previously known or ascertained or being adjusted in the manner hereinafter set forth. The waves emitted from the transmitting station will spread out, not only through the surrounding air, but also through the interior of the earth and if electrically conducting strata are present in the vicinity of the place selected for the investigation, the receiver will indicate the effect of waves received directly, or in a practically straight line, from the transmitter and simultaneously of other waves that have pierced the surface and have been reflected from the conductive strata situated below the surface. At the receiver these two systems of waves may be made to produce interferences and, by observing these interferences and either varying the wave lengths employed or the distance between the transmitting and receiving station, data can be gathered from which not only the presence but also the position of subterranean conductive strata can be determined by a comparatively simple calculation. Expressed in other words, the practical operation consists in varying the conditions of transmission in such a manner as to enable the observation of definite phase relations between the direct and the reflected waves.

The accompanying drawing illustrates diagrammatically a simple method by means of which a water holding stratum can be detected according to my present invention.

G, G represent the surface of the ground and W, W the surface of a subterranean stratum containing water.

In the present invention I measure by any known means as for instance by a chain a distance $a$ on the surface and at each end thereof I provide antennæ such as S and E. I prefer to place both antennæ horizontally as by stretching out a wire along the ground and in such a position that they are substantially parallel to each other. But according to circumstances their relative positions to each other and to the surface of the earth can be varied without departing from my invention. With the antenna S I connect apparatus (not shown) for generating and transmitting electrical waves and with the antenna E I connect other apparatus likewise not shown for receiving electrical waves. I then cause electrical waves to be emitted from S and produce interferences between the waves directly transmitted to the receiver in the direction of $a$ and those reflected from the surface W, W of the conductive stratum, as by varying the length of the emitted waves or by varying the distance $a$ between the transmitting and receiving stations. The reflection of the waves follows the usual law; that is, the angles of incidence and reflection are equal.

In a typical example, the trial distance between the sending and receiving stations may be say 1000 meters and the antennæ employed may be 50 meters or more in length. It is found best to employ relatively long waves in order to minimize the disturbing effects of irregularities in the surface of the reflecting stratum. Wave lengths of 400 or 500 meters are sufficiently great for this purposes under ordinary circumstances.

Interferences of the waves arriving directly from S and the waves piercing the earth and arriving at E after being reflected from the surface W, W of the conductive stratum at P are indicated by a minimum or a maximum current effect at the receiver. At the receiving station the values of the currents thus induced may be observed, for example, with the aid of a quantitative detector and an indicating galvanometer.

In practice, an operator at the sending station S may send signals of a convenient known wave length to E where the value of the current induced is observed and recorded. The operator at S then sends signals of a somewhat different wave length, the corresponding current value being noted at E. Thus by gradually varying the wave lengths sent from S a series of different current strengths may be obtained and noted at E, and this series will show recurring maxima and minima. The wave lengths $\lambda^1$ and $\lambda^2$ for any two consecutive interference maxima or minima can, of course, be ascertained by comparing the data recorded at the sending station and that recorded at the receiving station. Having these wave lengths and knowing the straight-line distance between the stations, the depth of the subterranean reflecting surface can be readily computed as shown hereinafter.

Let the distance SPE equal $b$. If $\Delta$ represents the difference between the distance traveled by a wave in passing directly from S to E and that traveled by a wave from S reaching E after reflection at P then $$\Delta = b - a.$$

But $$h^2 = \left(\frac{b}{2}\right)^2 - \left(\frac{a}{2}\right)^2,$$

whence by eliminating $b$, the depth $h$ of the reflecting stratum may be ascertained by the formula:

$$h = \tfrac{1}{2}\sqrt{\Delta^2 + 2a\Delta}$$

in which $a$ is the horizontal distance of the two stations S and E and in which it is supposed that the surface of the conductive stratum W, W is parallel to the surface G, G of the earth. Should it not be parallel the second formula will have to be modified according to known rules of trigonometry.

For the interference minima produced by two consecutive wave lengths $$\lambda^1 \text{ and } \lambda^2 \ (\lambda^1 < \lambda^2),$$

$\Delta$ must be equal to a whole number of half wave lengths $$\left(\frac{\lambda^1}{2} \text{ or } \frac{\lambda^2}{2}\right);$$

and when the minima are immediately successive, the number of such half wave lengths corresponding to $\Delta$, expressed in terms of $$\frac{\lambda^1}{2}$$

differs by $1$ from the same distance expressed in terms of $$\frac{\lambda^2}{2}.$$

Thus $$\Delta = n\frac{\lambda^2}{2} = (n+1)\frac{\lambda^1}{2}$$

where $n$ is a whole number. By eliminating $n$ it follows that $$\Delta = \tfrac{1}{2} = \frac{\lambda^1 \lambda^2}{\lambda^2 - \lambda^1}$$

By observing $\lambda^1$ and $\lambda^2$ and computing therefrom the value of $\Delta$, the value of $h$ is readily obtained.

The foregoing discussion assumes a specific case for the sake of simplicity and for the purpose of developing a formula which gives, within the limits of error, the maximum depth at which the reflecting surface of the conductive stratum in each particular instance may lie. The new method is of general application whatever be the dip of the conductive stratum and its location relative to the sending and receiving stations; and the value of $h$ obtained from the above formula by inserting therein the wave lengths corresponding to the observed consecutive interference minima determines a locus upon which the reflecting surface must lie or to which it must be tangent. The nature of this locus is apparent from the following considerations: In an ellipsoid of revolution the radii from the foci to any given point on the surface of the ellipsoid make equal angles with the plane tangent to the ellipsoid at that point; and the sum of the lengths of the radii at any point on the surface is a constant. It follows therefore that if waves of energy emanate in straight lines from one focus to the inner surface of the ellipsoid, they will be reflected to the other focus; and it also follows that the length of the paths traveled by such waves in passing from one focus to the other will be constant. Applying these facts to the present case, it is clear that in general the point on the surface of the conductive stratum from which waves are reflected to the receiving station must be located on the surface of an ellipsoid of revolution of which the sending and receiving stations are the foci; or, in other words, the conductive stratum must be tangent to such an ellipsoid. The half minor axis of this ellipsoid may be determined from the formula developed hereinbefore; for Δ, which is simply the difference between the distance $a$ separating the stations or the foci of the ellipsoid and the constant sum $b$ of the lengths of the radii at the point of tangency, is a constant for all points on the surface of the ellipsoid, including the points at which planes parallel to the straight line connecting the stations are tangent to the ellipsoid. Consequently, since Δ and $a$ are both known, $h$ is determinable from the formula, and represents the half minor axis of the ellipsoid of which the stations are the foci and to which the conductive stratum is tangent at some point on the approximate half ellipsoid below the ground.

It is to be noted that two important results have thus been attained by carrying out the method as above described. First, the presence of a conducting stratum has been detected, and second, the maximum depth below the ground at which the tangency of the stratum to the ellipsoid locus can occur has been ascertained. This information enables one to determine whether or not it is probably worth while to try to locate the water or ore stratum more definitely. Where $h$ is found to be excessively great, further trouble and expense are thus saved.

After the presence of the conductive stratum and its general locus have been determined in the manner above set forth, its location can be ascertained more exactly in various ways as for example by swinging the horizontal receiving antenna in a horizontal plane around the receiving instrument and observing the value of the receiving current for different positions of the antenna. The reflected waves will have their maximum effect when the antenna is at right angles to the direction of such waves. Having found this maximum effect position, the direction of the reflected waves and consequently the location of the reflecting surface are determined.

Any ordinary known apparatus for generating and receiving electrical waves can be used and various modifications in the manner of arranging the antennæ and calculating the results of the observations may be employed as dictated by individual circumstances and as will readily present themselves to the mind of persons conversant with art of wireless telegraphy.

Having now particularly described and ascertained the nature of my said invention and in what manner the same is to be performed I declare that what I claim is:

1. The method of ascertaining the presence and approximate location of electrically conductive subterranean strata which comprises placing on the surface of the earth at a known distance apart means for transmitting and means for receiving electrical waves, emitting electrical waves from the transmitting means, and observing at the receiving means interferences between the waves transmitted directly from the transmitting means and those reflected from the conductive stratum, whereby the location of the stratum may be calculated from the data observed.

2. The method of ascertaining the presence and approximate location of electrically conductive subterranean strata which comprises placing on the surface of the earth in a substantially horizontal position antennæ at a known distance from and substantially parallel to each other, emitting electrical waves from one antenna and observing at the other interferences between the waves received directly from the first antenna and the waves received indirectly therefrom by reflection from a subterranean stratum, whereby the location of the stratum may be calculated from the data observed.

3. The method of ascertaining the presence and approximate location of electrically conductive subterranean strata which comprises placing on the surface of the earth at a known distance apart means for transmitting and means for receiving electrical waves, emitting electrical waves of different lengths from the transmitting means, and observing at the receiving means the corresponding values of the currents induced thereby at the said receiving means, whereby interferences between the waves received at the receiving means directly from the transmitting means and those received after reflection from a subterranean conductive stratum may be detected and the location of such stratum may be calculated.

4. The method of detecting conductive subterranean strata which comprises transmitting wireless waves of known length between stations at points above the supposed location of such a stratum and at a known distance apart, and varying transmission conditions until the existence or non-existence of interferences with waves transmitted directly between the stations by waves reflected upwardly from such stratum is ascertained.

5. The method of detecting and locating conductive subterranean strata which comprises transmitting wireless waves of known length between stations at points above the supposed location of such a stratum and at a known distance apart, and varying transmission conditions until the existence of interferences with waves transmitted directly between the stations by waves reflected upwardly from such a stratum is ascertained, and then further varying such transmission
5 conditions until a definite phase relation is established between the directly transmitted and the reflected waves, whereby the maximum possible depth of the reflecting surface of such a stratum can be determined.

In testimony, that I claim the foregoing as my invention, have signed my name in presence of two subscribing witnesses.

HEINRICH LÖWY.

Witnesses:
HENRY HASPER,
WOLDEMAR HAUPT.

---

Correction in Letters Patent No. 1,045,575.

It is hereby certified that in Letters Patent No. 1,045,575, granted November 26, 1912, upon the application of Heinrich Löwy, of Göttingen, Germany, for an improvement in "Methods of Locating Subterranean Strata," an error appears in the printed specification requiring correction as follows: Page 2, lines 93–94, for the formula "$\triangle = \frac{1}{2} = \frac{\lambda^1\,\lambda^2}{\lambda^2 - \lambda^1}$" read $\triangle = \frac{1}{2} \cdot \frac{\lambda^1\,\gamma^2}{\lambda^2 - \lambda^1}$; and that the said Letters Patent should be read with this correction therein that the same may conform to the record of the case in the Patent Office.

Signed and sealed this 31st day of December, A. D., 1912.

[SEAL.]

C. C. BILLINGS,

*Acting Commissioner of Patents.*